US 10,879,742 B2

(12) United States Patent
Okina

(10) Patent No.: US 10,879,742 B2
(45) Date of Patent: Dec. 29, 2020

(54) CONTROL APPARATUS, POWER TRANSMISSION APPARATUS, CONTACTLESS POWER TRANSMISSION SYSTEM, AND ELECTRONIC DEVICE

(71) Applicant: SEIKO EPSON CORPORATION, Tokyo (JP)

(72) Inventor: Katsumi Okina, Fuchu (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/655,721

(22) Filed: Oct. 17, 2019

(65) Prior Publication Data

US 2020/0127502 A1 Apr. 23, 2020

(30) Foreign Application Priority Data

Oct. 18, 2018 (JP) .................................. 2018-196409

(51) Int. Cl.
*H02J 50/40* (2016.01)
*H02J 50/10* (2016.01)
*H02J 50/80* (2016.01)
*H02J 50/90* (2016.01)
*H02J 7/02* (2016.01)

(52) U.S. Cl.
CPC .............. *H02J 50/40* (2016.02); *H02J 50/10* (2016.02); *H02J 50/402* (2020.01); *H02J 50/80* (2016.02); *H02J 7/025* (2013.01); *H02J 50/90* (2016.02)

(58) Field of Classification Search
CPC .. H02J 50/10; H02J 50/12; H02J 50/40; H02J 50/402; H02J 50/80; H02J 50/90; H04B 5/0037; H04B 5/0031; H04B 5/0075; H04B 5/0087
See application file for complete search history.

(56) References Cited

U.S. PATENT DOCUMENTS

2013/0015705 A1\* 1/2013 Abe ........................ H02J 7/025
307/29
2018/0123646 A1 5/2018 Onishi

FOREIGN PATENT DOCUMENTS

JP 2017-158315 A 9/2017
JP 2018-074741 A 5/2018

\* cited by examiner

*Primary Examiner* — Ryan Johnson
(74) *Attorney, Agent, or Firm* — Oliff PLC

(57) ABSTRACT

When landing detection or removal detection for a power reception apparatus through intermittent power transmission is performed in a first channel and landing detection or removal detection for a power reception apparatus through intermittent power transmission is performed in a second channel, a control circuit controls a transmission timing of a second drive pulse in the intermittent power transmission of the second channel such that a first drive pulse in the intermittent power transmission of the first channel and the second drive pulse do not overlap.

12 Claims, 12 Drawing Sheets

CONTROL APPARATUS, POWER TRANSMISSION APPARATUS, CONTACTLESS POWER TRANSMISSION SYSTEM, AND ELECTRONIC DEVICE

The present application is based on, and claims priority from JP Application Serial Number 2018-196409, filed Oct. 18, 2018, the disclosure of which is hereby incorporated by reference herein in its entirety.

BACKGROUND

1. Technical Field

The present disclosure relates to a control apparatus, a power transmission apparatus, a contactless power transmission system, and an electronic device.

2. Related Art

Contactless power transmission is known which enables power transmission without metal contacts by using electromagnetic induction. Application examples of contactless power transmission include power supply to an electronic device such as a household device, a portable terminal, or an electric automobile.

In contactless power transmission, a power transmission apparatus has multiple channels and transmits power to multiple power reception apparatuses using the multiple channels in some cases. One channel is a path through which power is transmitted from one primary coil to a secondary coil of one power reception apparatus. At this time, a state transition is performed between states such as landing detection, normal power transmission, and removal detection in each channel of the power transmission apparatus, and state transitions are controlled independently in each channel. When state transitions are controlled independently in each channel in this manner, there is a possibility that the power transmission apparatus will no longer operate suitably due to interference between the channels. Interference between channels is a phenomenon in which a primary coil of a channel and a secondary coil of a different channel couple electromagnetically.

For example, JP-A-2018-074741 discloses a technique of suitably performing communication or power transmission between a power transmission apparatus and power reception apparatuses by reducing interference between channels. In JP-A-2018-074741, when one of the first channel and the second channel performs normal power transmission and the other performs landing detection or removal detection through intermittent power transmission, the driving phase of the intermittent power transmission and the driving phase of the normal power transmission are set to be the same. Accordingly, interference between the channels is reduced.

JP-A-2018-074741 is an example of the related art.

In JP-A-2018-074741 above, a case is envisioned in which one channel performs normal power transmission and another channel performs intermittent power transmission. However, when two channels both perform landing detection or removal detection through intermittent power transmission, there is a problem in that there is a possibility that the power transmission apparatus will no longer operate suitably due to interference between the channels.

That is, in landing detection and removal detection, the power reception apparatus performs load modulation as a response to a drive pulse for intermittent power transmission, and the power transmission apparatus detects landing or removal based on the load modulation. For this reason, there is a possibility that due to the load modulation in one channel influencing the other channel, landing or removal will be erroneously detected in the other channel. This erroneous detection occurs when the drive pulses for intermittent power transmission in two channels overlap, but since state transitions are controlled independently in each channel as described above, the drive pulses for intermittent power transmission in the two channels overlap in some cases.

SUMMARY

One aspect of the present disclosure relates to a control apparatus for controlling a first power transmission driver configured to transmit power to a first power reception apparatus by driving a first primary coil and a second power transmission driver configured to transmit power to a second power reception apparatus by driving a second primary coil, the control apparatus including a control circuit, wherein when landing detection or removal detection for the first power reception apparatus through intermittent power transmission is performed in a first channel in which power transmission is performed by the first power transmission driver, and landing detection or removal detection for the second power reception apparatus through intermittent power transmission is performed in a second channel in which power transmission is performed by the second power transmission driver, the control circuit controls a transmission timing of a second drive pulse in the intermittent power transmission of the second channel such that a first drive pulse in the intermittent power transmission of the first channel and the second drive pulse do not overlap.

BRIEF DESCRIPTION OF THE DRAWINGS

The disclosure will be described with reference to the accompanying drawings, wherein like numbers reference like elements.

DESCRIPTION OF EXEMPLARY EMBODIMENTS

The following is a detailed description of preferred embodiments of the present disclosure. Note that the embodiments described below are not intended to unduly limit the content of the invention recited in the claims, and all of the configurations described in the embodiments are not necessarily essential as solutions provided by the present disclosure.

1. Contactless Power Transmission System

Figure 1:
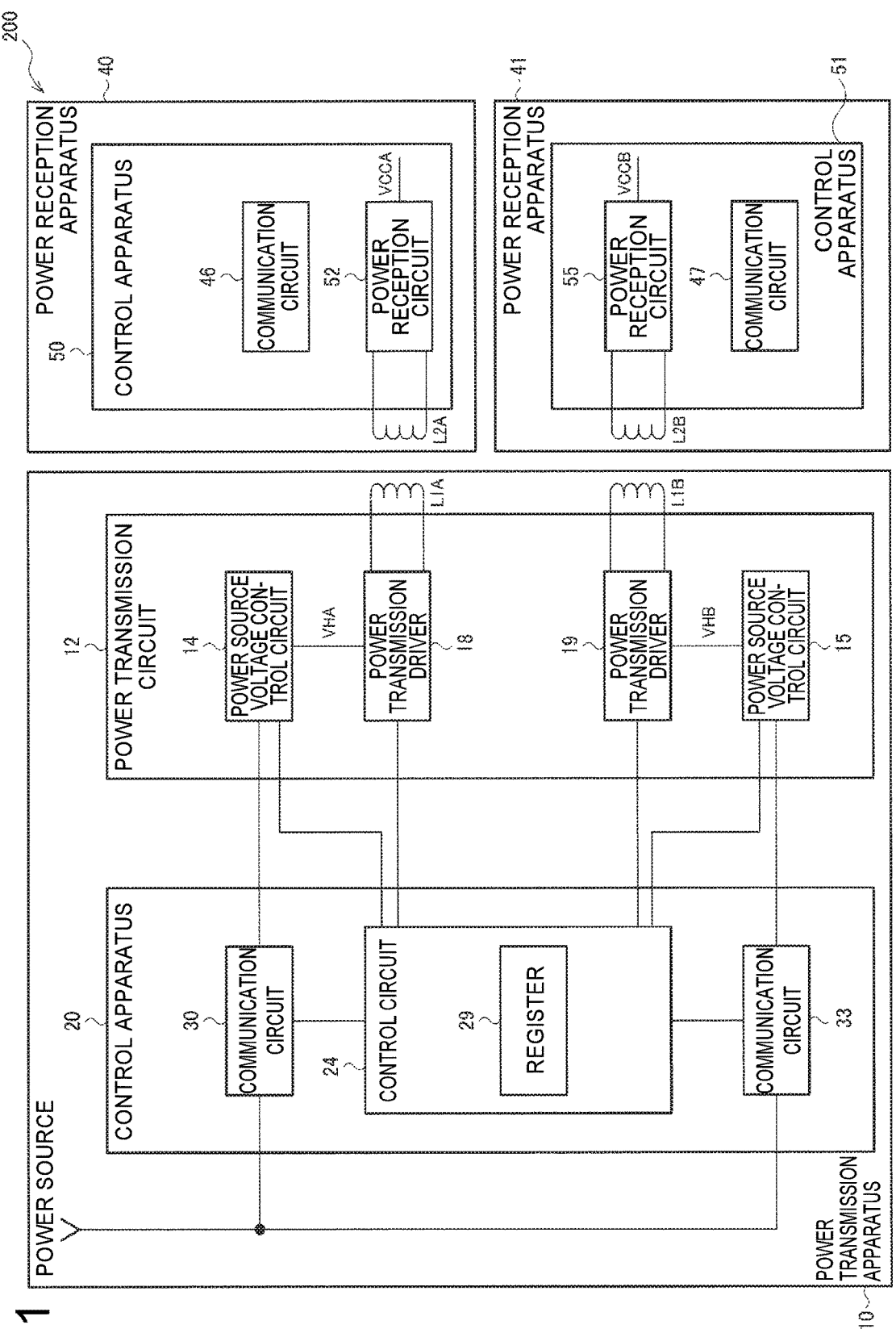
FIG. 1 is an example of a configuration of a contactless power transmission system.

FIG. 1 is an example of a configuration of a contactless power transmission system 200. The contactless power transmission system 200 includes: a power transmission apparatus 10; a power reception apparatus 40, which is a first power reception apparatus; and a power reception apparatus 41, which is a second power reception apparatus. Note that the power transmission apparatus, the power reception apparatus, and the contactless power transmission system of the present embodiment are not limited to the configuration of FIG. 1, and various modifications are possible, such as omitting some of the constituent elements, or adding another constituent element. For example, description will be given hereinafter taking, as an example, a case in which the power transmission apparatus is configured to transmit power to two power reception apparatuses, but the power transmission apparatus may also be configured to transmit power to three or more power reception apparatuses.

The power transmission apparatus 10 includes: a control apparatus 20, which is a power transmission control apparatus; a power transmission circuit 12; a primary coil L1A, which is a first primary coil; and a primary coil L1B, which is a second primary coil. The power transmission apparatus 10 is an apparatus that transmits power to the power reception apparatuses 40 and 41 due to electromagnetic coupling of the primary coils L1A and L1B and secondary coils L2A and L2B. The control apparatus 20 of the power transmission apparatus 10 includes: a control circuit 24, which is a power transmission control circuit; a communication circuit 30, which is a first communication circuit; and a communication circuit 33, which is a second communication circuit. The control apparatus 20 is an integrated circuit apparatus or the like. The power transmission circuit 12 includes: a power transmission driver 18, which is a first power transmission driver; a power transmission driver 19, which is a second power transmission driver; a power source voltage control circuit 14, which is a first power source voltage control circuit; and a power source voltage control circuit 15, which is a second power source voltage control circuit.

The power reception apparatus 40 includes: a control apparatus 50, which is a first power reception control apparatus; and a secondary coil L2A, which is a first power reception coil. The power reception apparatus 41 includes: a control apparatus 51, which is a second power reception control apparatus; and a secondary coil L2B, which is a second power reception coil. The control apparatuses 50 and 51 are, for example, integrated circuit apparatuses. The power reception apparatuses 40 and 41 are apparatuses that receive power transmitted from the power transmission apparatus 10 due to the above-described electromagnetic coupling, and supply the received power to, for example, a battery or a circuit. The control apparatus 50 of the power reception apparatus 40 includes: a power reception circuit 52, which is a first power reception circuit; and a communication circuit 46, which is a first power reception communication circuit. The control apparatus 51 of the power reception apparatus 41 includes: a power reception circuit 55, which is a second power reception circuit; and a communication circuit 47, which is a second power reception communication circuit.

The power reception circuit 52 receives the power transmitted from the power transmission driver 18 via the primary coil L1A and the secondary coil L2A. The power reception circuit 55 receives the power transmitted from the power transmission driver 19 via the primary coil L1B and the secondary coil L2B. Specifically, an alternating-current electromotive force is generated in the secondary coils L2A and L2B due to the transmitted power being received in the secondary coils L2A and L2B. Then, the power reception circuits 52 and 55 output rectified voltages VCCA and VCCB by rectifying the alternating-current signals from the secondary coils L2A and L2B. The rectified voltages VCCA and VCCB are also called "received voltages". The power reception circuits 52 and 55 are constituted by rectifying circuits.

The communication circuits 46 and 47 transmit communication data from the power reception apparatuses 40 and 41 to the power transmission apparatus 10 through load modulation. Load modulation is a method in which the amplitudes of currents flowing in the primary coils L1A and L1B are modulated by varying the output loads of the secondary coils L2A and L2B. The communication circuits 30 and 33 on the power transmission side receive the communication data from the power reception apparatuses 40 and 41 by detecting the currents that flow from the power source to the power transmission drivers 18 and 19.

The power source voltage control circuits 14 and 15 generate the power source voltages VHA and VHB of the power transmission drivers 18 and 19. The power transmission driver 18 is a buffer circuit that operates due to the power source voltage VHA, and the buffer circuit drives the primary coil L1A by buffering the first transmission signal from the control circuit 24. Similarly, the power transmission driver 19 is a buffer circuit that operates due to the power source voltage VHB, and the buffer circuit drives the primary coil L1B by buffering the second transmission signal from the control circuit 24. The first and second transmission signals are rectangular-wave signals of a predetermined frequency, for example. The voltage values of the power source voltages VHA and VHB generated by the power source voltage control circuits 14 and 15 are controlled by the control circuit 24. The voltage amplitudes of the drive signals output by the power transmission drivers 18 and 19 are controlled due to the power source voltages VHA and VHB being controlled. Accordingly, the transmitted power from the primary coils L1A and L1B is controlled. The power source voltage control circuits 14 and 15 are DC-DC converters that convert power source voltages supplied from the power source into the power source voltages VHA and VHB. The currents that flow from the power source to the power transmission drivers 18 and 19 via the power source voltage control circuits 14 and 15 are modulated through load modulation. The communication circuits 30 and 33 receive the communication data from the power reception apparatuses 40 and 41 by demodulating the modulation of the current through binarization. For example, the communication circuits 30 and 33 each include: a resistor that is connected between the power source and the power source voltage control circuit 14 or 15; an amplification circuit that amplifies the voltage difference between both ends of the resistor; and a comparator that binarizes the output of the amplification circuit.

The control circuit 24 includes a register 29. The register 29 stores setting information for setting the operation of the control apparatus 20. As will be described later, information on the width of the drive pulse or the like is set in the register 29, for example. For example, the control apparatus 20 includes an interface circuit (not shown) and a processing apparatus provided outside of the control apparatus 20 writes the setting information in the register 29 via the interface circuit.

Note that various devices can be envisioned as the electronic devices 510 and 512 on the power reception side. For example, various electronic devices such as a hearing aid, wireless headphones, a wrist watch, a biological information measurement apparatus, a portable information terminal, a cordless telephone, a shaver, an electrically-powered toothbrush, a wrist computer, a handy terminal, an in-vehicle device, a hybrid car, an electric automobile, an electrically-powered bike, or an electrically-powered automobile can be envisioned thereas. Electronic devices of the same type or electronic devices of different types may be used as the combination of the electronic devices 510 and 512. For example, the electronic devices 510 and 512 are hearing aids for the right ear and the left ear. Alternatively, the electronic devices 510 and 512 are wireless headphones for the right ear and the left ear. Alternatively, one of the electronic devices 510 and 512 is a wrist watch or a biological information measurement apparatus and the other is a portable information terminal. For example, the power reception apparatus can be incorporated in various moving bodies, such as a car, an airplane, a bike, a bicycle, or a ship. A moving body is a device or apparatus that includes a drive mechanism such as a motor or an engine, a steering mechanism such as a steering wheel or a rudder, and various types of electronic devices, and moves on land, in the sky, or on water.

Figure 2:
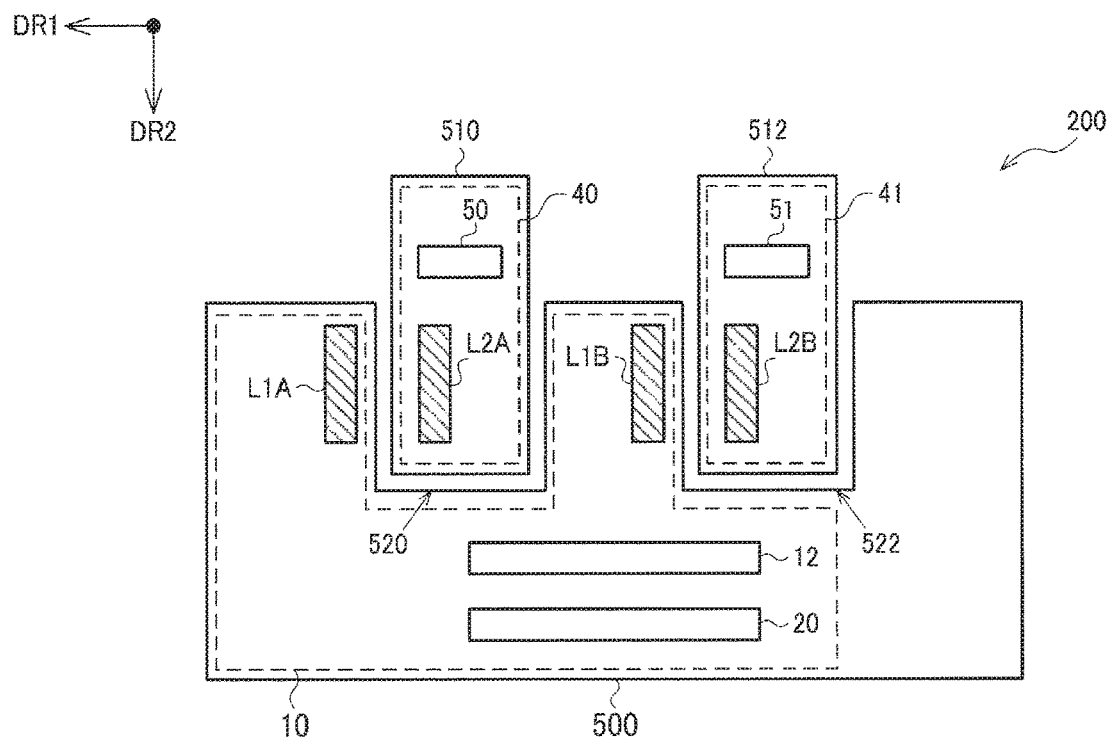
FIG. 2 is an example of a contactless power transmission system.

FIG. 2 is an example of the contactless power transmission system 200. Note that in FIG. 2, small devices such as hearing aids or earphones are envisioned as the electronic devices 510 and 512 on the power reception side. However, there is no limitation to this, and the above-described various devices can be used as the electronic devices 510 and 512 on the power reception side.

The contactless power transmission system 200 includes: a charger 500, which is a power transmission electronic device; an electronic device 510, which is a first power reception electronic device; and an electronic device 512, which is a second power reception electronic device. The charger 500 includes primary coils L1A and L1B, a control apparatus 20, and a power transmission circuit 12. That is, the charger 500 includes the power transmission apparatus 10. The electronic devices 510 and 512 includes secondary coils L2A and L2B and control apparatuses 50 and 51. That is, the electronic devices 510 and 512 include the power reception apparatuses 40 and 41. A pair of electronic devices, such as hearing aids or earphones, can be envisioned as the electronic devices 510 and 512. Note that the electronic device including the control apparatus 20 of the power transmission apparatus 10 in the present disclosure corresponds to the charger 500 in the example of FIG. 2. The configuration of the charger 500, which is the power transmission electronic device, is not limited to FIG. 2. For example, the charger 500 may also be able to charge three or more electronic devices, and the charger 500 need not include recesses serving as arrangement portions 520 and 522.

The charger 500 is provided with an arrangement portion 520 for arranging the electronic device 510 that is to be charged with the electric signal from the primary coil L1A, and an arrangement portion 522 for arranging the electronic device 512 that is to be charged with the electric signal from the primary coil L1B.

Specifically, two recessed portions for inserting the electronic devices 510 and 512 are provided aligned laterally in the housing of the charger 500, and the two recessed portions correspond to the arrangement portions 520 and 522. When the direction of inserting the electronic devices 510 and 512 into the recessed portion is set as a first direction DR1, the primary coils L1A and L1B are provided in the walls of the recessed portions on a second direction DR2 side, the second direction DR2 intersecting the first direction DR1. The electronic devices 510 and 512 are provided with the secondary coils L2A and L2B. The primary coils L1A and L1B and the secondary coils L2A and L2B are, for example, planar coils, and when the electronic devices 510 and 512 are inserted into the recessed portions, the primary coils L1A and L1B and the secondary coils L2A and L2B oppose each other. That is, the axes of the primary coils L1A and L1B and the secondary coils L2A and L2B are parallel in the second direction DR2. Note that the axes of the coils need only be approximately parallel in the second direction DR2.

Hereinafter, the path through which power transmission, communication, and the like are performed via the primary coil L1A and the secondary coil L2A between the power transmission apparatus 10 and the power reception apparatus 40 will be called the first channel. Also, the path through which power transmission, communication, and the like are performed via the primary coil L1B and the secondary coil L2B between the power transmission apparatus 10 and the power reception apparatus 41 will be called the second channel.

In the contactless power transmission system 200 of FIG. 2, from the viewpoint of suppressing unnecessary coupling between coils in different channels, it is preferable that the arrangement portions 520 and 522 of the charger 500 are located away from each other. However, the arrangement portions 520 and 522 are often arranged close together due to requirements such as reducing the size of the charger 500. For example, when the electronic devices 510 and 512 are small devices such as hearing aids or earphones, it is envisioned that the arrangement portions 520 and 522 are very close to each other. In such a case, the primary coil L1B of the second channel and the secondary coil L2A of the first channel will be close to each other, and therefore these coils are more likely to couple electromagnetically. Alternatively, the primary coil L1A of the first channel and the secondary coil L2B of the second channel will be close to each other, and therefore these coils are more likely to couple electromagnetically.

Specifically, when the power reception apparatus of one channel is landed in the charger 500 and the power reception apparatus of the other channel has been removed from the charger 500, the above-described coupling is likely to occur. That is, due to the fact that there is no coupling partner for the primary coil of the channel on the side from which the power reception apparatus has been removed, the primary coil of that channel is likely to couple with the secondary coil of the other channel. For this reason, there is a possibility that the channel on the side from which the power reception apparatus has been removed will be influenced by the load modulation of the channel on the side on which the power reception apparatus is landed, resulting in erroneous operation. Hereinafter, an example of a state in which erroneous operation occurs and operations of the present embodiment, which can prevent erroneous operation will be described.

2. Operations of the Present Embodiment

Figure 3:
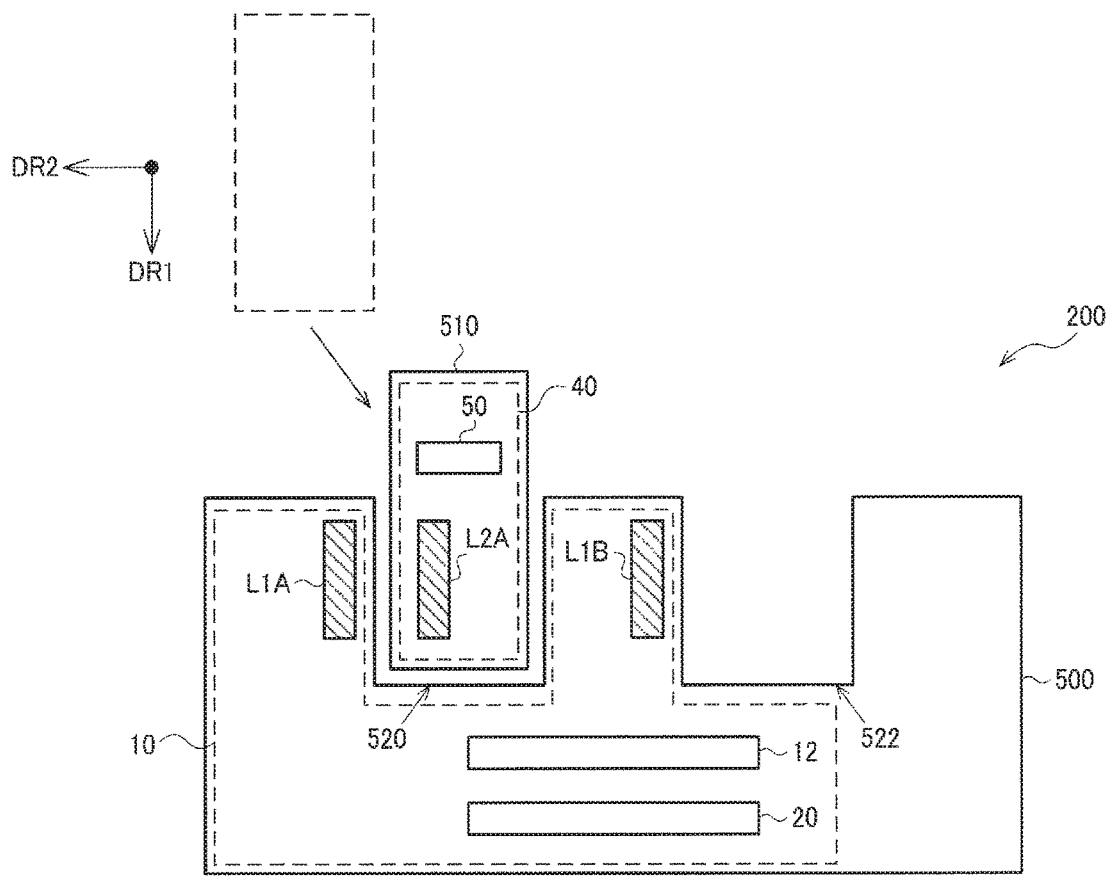
FIG. 3 is a diagram illustrating a first operation example of a contactless power transmission system.

FIG. 3 is an example of first operations of the contactless power transmission system 200. In FIG. 3, both the first channel and the second channel perform landing detection, the electronic device 510 on the first channel side moves from the non-landed state to the landed state, and the electronic device 512 on the second channel side is in the non-landed state. The primary coil L1B on the second channel side originally couples with the secondary coil L2B of the second channel. However, since there is no secondary coil L2B, the primary coil L1B on the second channel side is likely to couple with the secondary coil L2A on the first channel side.

Figure 4:
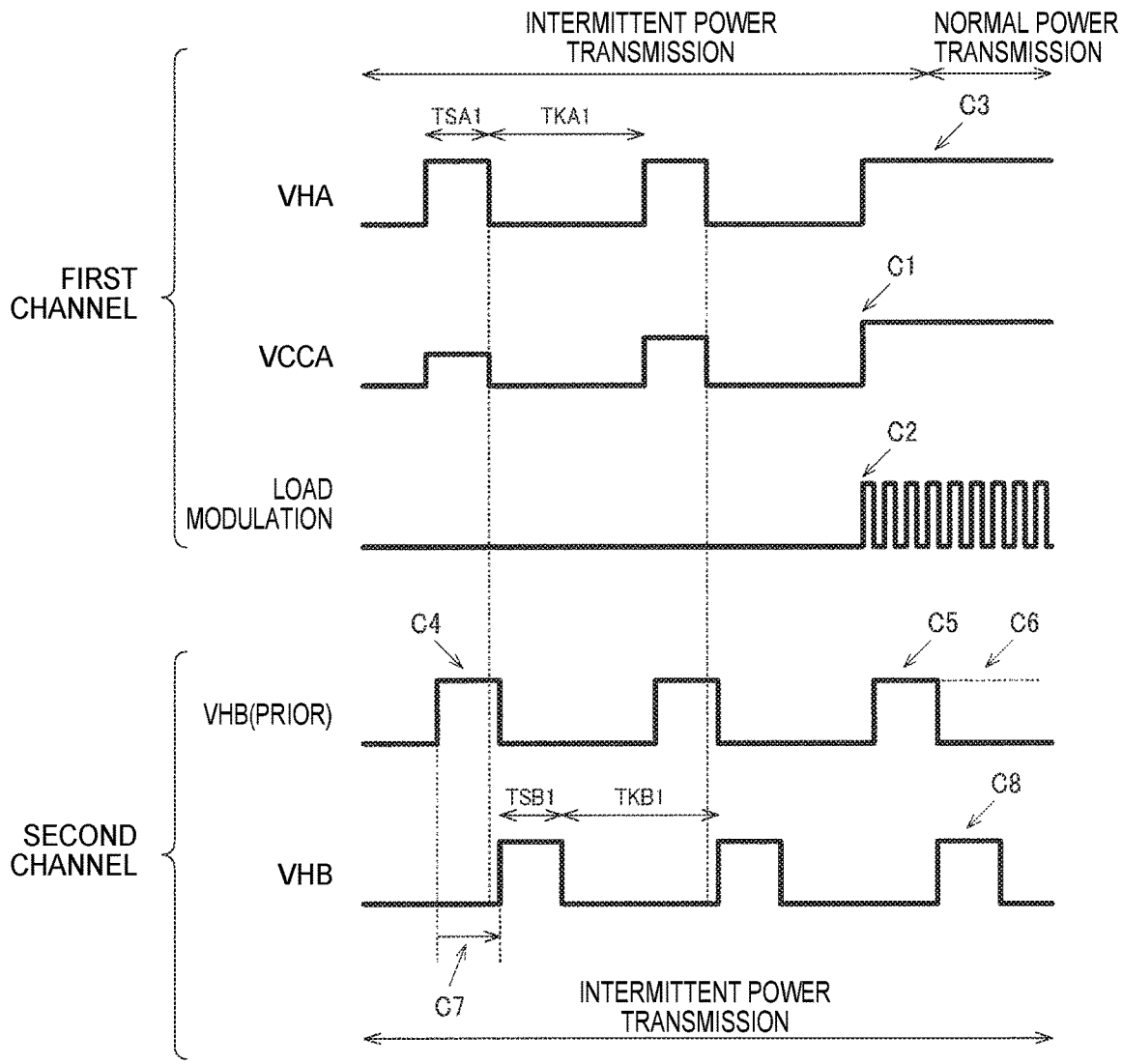
FIG. 4 is a diagram showing a waveform in the first operation example.

FIG. 4 is a diagram showing waveforms in the first operation example. Note that for the second channel, the waveform obtained when the operation of the present embodiment is not applied is indicated as "VHB (prior)".

In the landing detection of the first channel, intermittent power transmission is performed from the power transmission apparatus 10 to the power reception apparatus 40. That is, the drive signal is applied from the power transmission driver 18 to the primary coil L1A due to the power source voltage control circuit 14 raising the power source voltage VHA in a power transmission period TSA1. On the other hand, in the intermission period TKA1, the drive signal is applied from the power transmission driver 18 to the primary coil L1A. Intermittent power transmission is performed due to the power transmission period TSA1 and the intermission period TKA1 being repeated at a predetermined interval. The drive signal in the power transmission period TSA1 is called the drive pulse. Also, the drive pulse in intermittent power transmission of the first channel is called the first drive pulse.

When power is transmitted from the power transmission apparatus 10 to the power reception apparatus 40 in the power transmission period TSA1, the rectified voltage VCCA of the power reception apparatus 40 rises. When the power reception apparatus 40 is brought close to the power transmission apparatus 10 in order to land the power reception apparatus 40 on the power transmission apparatus 10, the distance between the primary coil L1A and the secondary coil L2A shortens, and therefore the rectified voltage VCCA increases. Then, when the rectified voltage VCCA becomes greater than a threshold value voltage as indicated by C1 in FIG. 4, the communication circuit 46 of the power reception apparatus 40 starts load modulation as indicated by C2. The communication circuit 30 of the power transmission apparatus 10 receives communication data obtained through load modulation, and the control circuit 24 determines that the power reception apparatus 40 is landed based on the communication data. Then, as indicated by C3, the control circuit 24 transitions from a state of landing detection to a state of normal power transmission and performs normal power transmission to the power reception apparatus 40. Normal power transmission is continuous power transmission. That is, the power transmission driver 18 continuously drives the primary coil L1A.

In the landing detection of the second channel as well, similarly, the power source voltage control circuit 15 raises the power source voltage VHB in the power transmission period, whereby the drive pulse is applied from the power transmission driver 19 to the primary coil L1B. Intermittent power transmission is performed due to this process being repeated at a certain interval. The drive pulse in intermittent power transmission of the second channel is called the second drive pulse.

For example, when the power reception apparatuses 40 and 41 are removed from the power transmission apparatus 10, the power transmission apparatus 10 transitions to the state of landing detection, but the power reception apparatuses 40 and 41 may be removed at any timing. For this reason, the relationship between the timing at which the first channel transitions to the state of landing detection and the timing at which the second channel transitions to the state of landing detection is undetermined, and the relationship between the output timings of the drive pulses is also undetermined between channels. For this reason, when the operation of the present embodiment is not applied, as indicated by C4 in FIG. 4, the drive pulse of the first channel and the drive pulse of the second channel overlap in some cases.

At this time, as indicated by C5, when there is landing on the first channel side, the load modulation of the first channel is started in the power transmission period of the second channel. In this manner, when the load modulation of the first channel is started in the power transmission period of the second channel, there is a possibility that the load modulation will be received in the communication circuit 33 of the second channel due to coil coupling. As described above, the landing detection is performed in the power transmission period of the drive pulse in intermittent power transmission, and therefore when the load modulation is received in the communication circuit 33 in the power transmission period of the second channel, the control circuit 24 erroneously determines that the power reception apparatus 41 of the second channel is landed. Upon doing so, as indicated by the dotted line of C6, the second channel is erroneously transitioned to the state of normal power transmission. That is, despite the fact that the power reception apparatus 41 is not actually landed, normal power transmission is performed from the primary coil L1B of the second channel.

In view of this, in the present embodiment, the control circuit 24 of the power transmission apparatus 10 controls the transmission timing of the second drive pulse such that the first drive pulse in intermittent power transmission of the first channel and the second drive pulse in intermittent power transmission of the second channel do not overlap. Specifically, the control circuit 24 causes the second drive pulse to shift to later than the first drive pulse by delaying the second drive pulse with respect to the original transmission timing.

That is, as indicated by C7, the control circuit 24 causes the power transmission period TSB1 of the second channel to shift to later than the power transmission period TSA1 of the first channel, and sets the power transmission period TSB1 of the second channel within the intermission period TKA1 of the first channel. Also, the power transmission period TSA1 of the first channel falls within the intermission period TKB1 of the second channel due to this shift. Accordingly, since the power transmission period in which landing detection is performed no longer overlaps between the first channel and the second channel, it is possible to prevent erroneous detection of landing. In the example of FIGS. 3 and 4, the load modulation in the landing detection of the first channel is no longer performed in the power transmission period, which is the landing detection period of the second channel, and therefore erroneous detection of landing in the second channel is prevented.

Note that since the load modulation is performed intermittently in normal power transmission, as indicated by C8, the drive pulse resulting from shifting in the second channel overlaps with the load modulation in the normal power transmission of the first channel. However, it is possible to prevent erroneous detection by causing the content of the communication data in landing detection and the communication data in normal power transmission to be different. That is, the communication data in the normal power transmission is received by the communication circuit 33 of the second channel in the transmission period of C8, and therefore the control circuit 24 can judge that landing has not occurred, according to the content of the communication data.

In FIGS. 3 and 4 described above, a case in which the second drive pulse of the second channel is shifted was described, but the control circuit 24 may also perform control for shifting the first drive pulse of the first channel. Specifically, the control circuit 24 gives priority to the channel that started transmitting the drive pulse first, and performs control for shifting the drive pulse of the channel that starts transmitting the drive pulse later.

Figure 5:
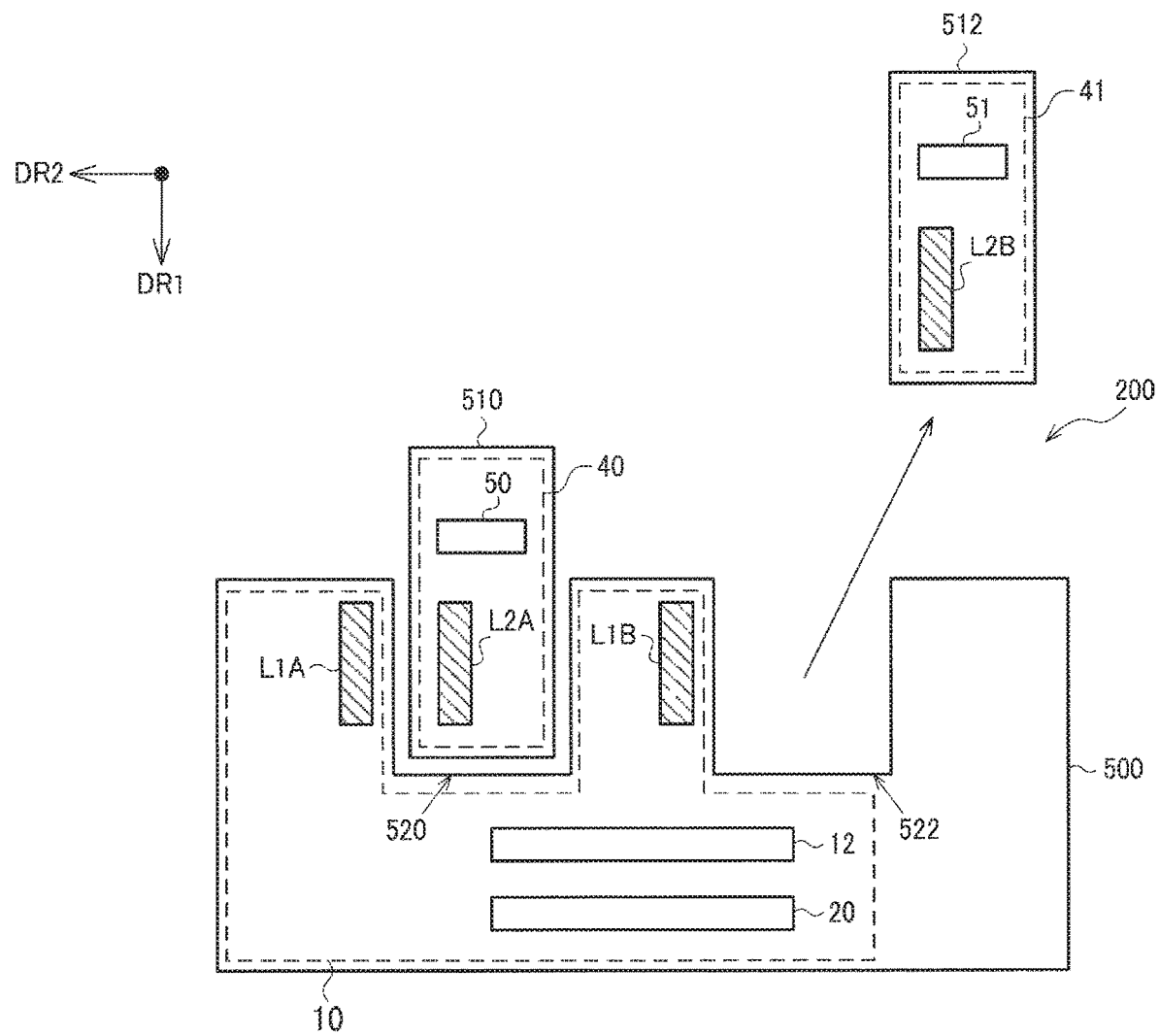
FIG. 5 is a diagram illustrating a second operation example of a contactless power transmission system.

FIG. 5 is a diagram illustrating a second operation example of the contactless power transmission system 200. In FIG. 5, both the first channel and the second channel perform removal detection, and the electronic device 510 on the first channel side is in a landed state, and the electronic device 512 on the second channel side has been removed. After the electronic device 512 on the second channel side is removed, there is no secondary coil L2B, which is the original coupling partner, and therefore the primary coil L1B on the second channel side is likely to couple with the secondary coil L2A on the first channel side.

Figure 6:
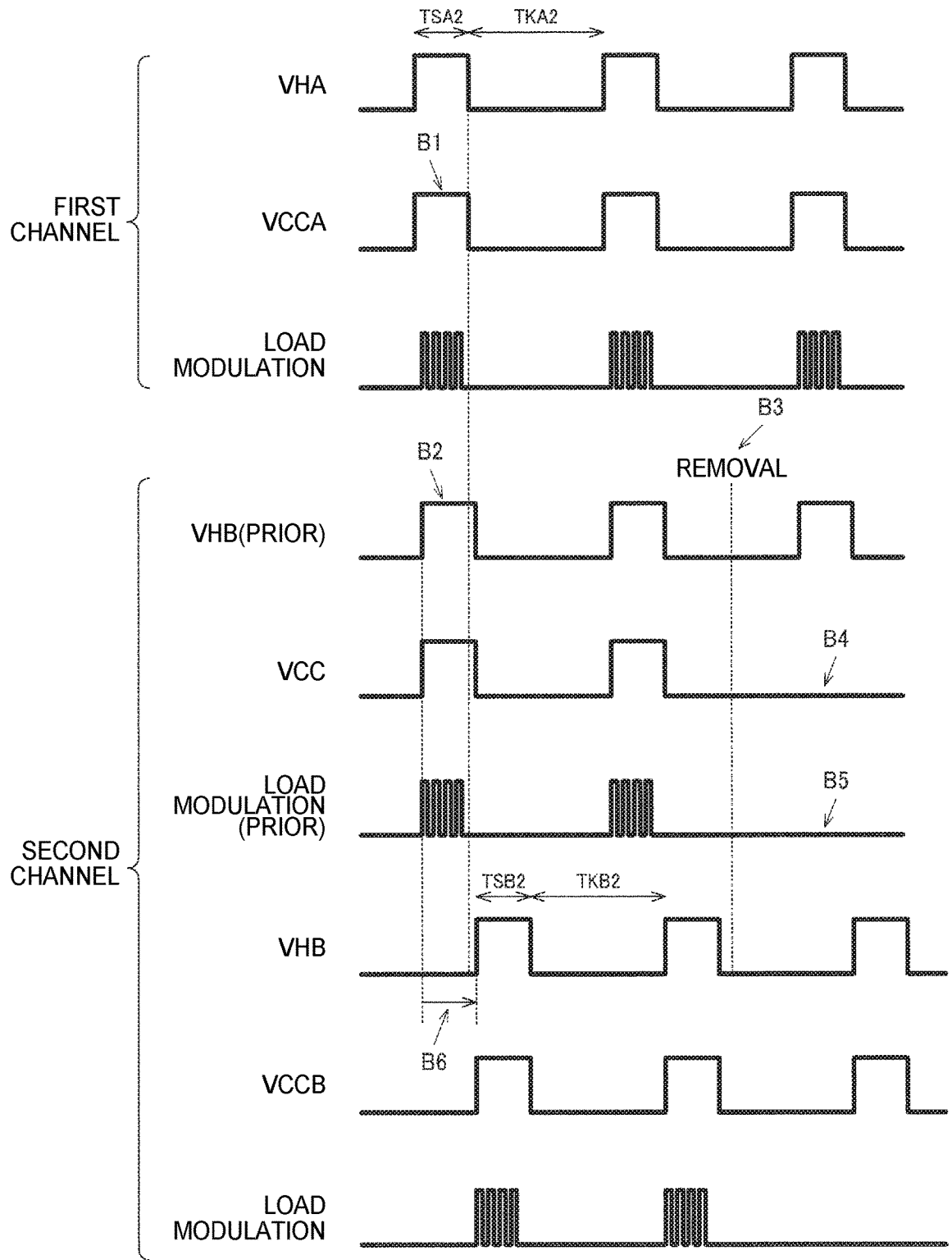
FIG. 6 is a diagram showing a waveform in the first operation example.

FIG. 6 is a diagram showing waveforms in the second operation example. Note that for the second channel, the waveform obtained when the operation of the present embodiment is not applied is indicated as "VHB (prior)" or the like.

In the removal detection of the first channel, intermittent power transmission is performed from the power transmission apparatus 10 to the power reception apparatus 40. That is, the drive signal is applied from the power transmission driver 18 to the primary coil L1A due to the power source voltage control circuit 14 raising the power source voltage VHA in a power transmission period TSA2. On the other hand, in the intermission period TKA2, the drive signal is applied from the power transmission driver 18 to the primary coil L1A. In removal detection as well, the drive pulse in intermittent power transmission of the first channel is called the first drive pulse. Note that the length of the intermission period TKA2 may also be different from the length of the intermission period TKA1 in landing detection.

When power is transmitted from the power transmission apparatus 10 to the power reception apparatus 40 in the power transmission period TSA2, the rectified voltage VCCA of the power reception apparatus 40 rises. As indicated by B1 in FIG. 6, when the rectified voltage VCCA is higher than a threshold value voltage, the communication circuit 46 of the power reception apparatus 40 performs load modulation. The communication circuit 30 of the power transmission apparatus 10 receives communication data obtained through load modulation, and the control circuit 24 determines that the power reception apparatus 40 has been removed based on the communication data.

In the removal detection of the second channel as well, similarly, the drive pulse is applied from the power transmission driver 19 to the primary coil L1B due to the power source voltage control circuit 15 raising the power source voltage VHB in the power transmission period. Intermittent power transmission is performed due to this process being repeated at a certain interval. In removal detection as well, the drive pulse in intermittent power transmission of the second channel is called the second drive pulse.

For example, when the batteries of the power reception apparatuses 40 and 41 are fully charged, the power transmission apparatus 10 transitions to the state of removal detection, but the batteries may become fully charged in the power reception apparatuses 40 and 41 at any timing. For this reason, the relationship between the timing at which the first channel transitions to the state of removal detection and the timing at which the second channel transitions to the state of removal detection is undetermined, and the relationship between the output timings of the drive pulses is also undetermined between the channels. For this reason, when the operation of the present embodiment is not applied, as indicated by B2 in FIG. 6, the drive pulse of the first channel and the drive pulse of the second channel overlap in some cases.

At this time, as indicated by B3, it is assumed that the power reception apparatus 41 of the second channel has been removed. Upon doing so, as indicated by B4, the rectified voltage VCCB rises in the power transmission period of the drive pulse, and therefore the communication circuit 47 of the power reception apparatus 41 does not perform load modulation, as indicated by B5. When the communication circuit 33 of the power transmission apparatus 10 does not detect load modulation in the power transmission period, the control circuit 24 determines that the power reception apparatus 41 was removed and causes the second channel to transition to the state of landing detection. However, if the primary coil L1B of the second channel has coupled with the secondary coil L2A of the first channel, there is a possibility that the load modulation of the first channel will be received by the communication circuit 47 of the second channel. When the communication circuit 47 receives the load modulation, the control circuit 24 erroneously detects that the power reception apparatus 41 has been removed. That is, despite the power reception apparatus 41 actually having been removed, the control circuit 24 does not cause the second channel to transition to the state of landing detection and erroneously maintains the state of removal detection.

In view of this, in the present embodiment, the control circuit 24 of the power transmission apparatus 10 controls the transmission timing of the second drive pulse such that the first drive pulse in intermittent power transmission of the first channel and the second drive pulse in intermittent power transmission of the second channel do not overlap.

That is, as indicated by B6, the control circuit 24 causes the power transmission period TSB2 of the second channel to shift to later than the power transmission period TSA1 of the first channel, and sets the power transmission period TSB2 of the second channel within the intermission period TKA2 of the first channel. Also, the power transmission period TSA2 of the first channel falls within the intermission period TKB2 of the second channel due to this shift. Accordingly, the power transmission period in which the removal detection is performed no longer overlaps between the first channel and the second channel, and therefore it is possible to prevent erroneous detection of removal. In FIGS. 5 and 6, the load modulation in removal detection of the first channel is no longer performed in the power transmission period, which is the removal detection period of the second channel, and therefore erroneous detection of removal in the second channel is prevented.

In FIGS. 5 and 6 described above, a case in which the second drive pulse of the second channel is shifted was described, but the control circuit 24 may also perform control for shifting the first drive pulse of the first channel.

Note that in the first operation example and the second operation example, a case in which both the first channel and the second channel perform landing detection, and a case in which both the first channel and the second channel perform removal detection were described, but there is no limitation to this, and the method of the present embodiment can be applied as long as both the first channel and the second channel perform intermittent power transmission. That is, when the first channel performs landing detection and the second channel performs removal detection, and when the first channel performs removal detection and the second channel performs landing detection as well, there is a risk that the load modulation of one channel will influence the other channel, and thereby erroneous detection will occur in the other channel. In these cases as well, it is possible to prevent erroneous detection by applying the method of the present embodiment.

3. Processing Flow

State control performed by the power transmission apparatus 10 will be described with reference to FIGS. 7 to 9. Hereinafter, an example in which the drive pulse of the second channel is shifted will be described, but state control performed when shifting the drive pulse of the first channel is similar thereto.

Figure 7:
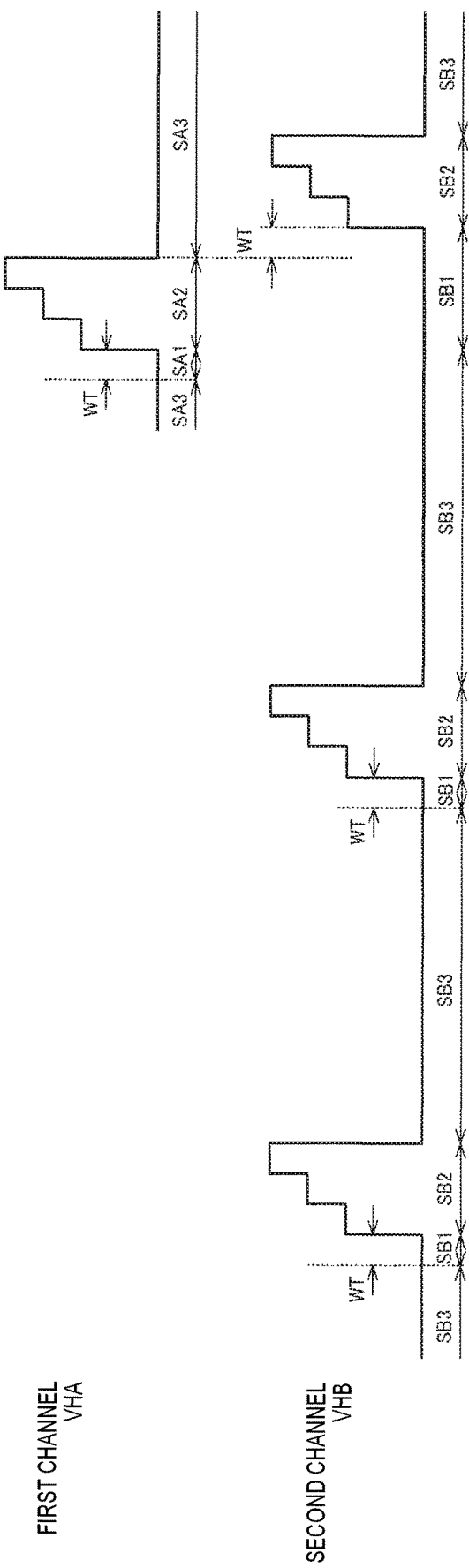
FIG. 7 is a diagram showing a waveform of a power source voltage supplied to a power transmission driver.

FIG. 7 shows a waveform of a power source voltage VHA supplied to the power transmission driver 18 of the first channel and a waveform of a power source voltage VHB supplied to the power transmission driver 19 of the second channel. The first channel transitions between a preparation state SA1, which is a first preparation state, an output state SA2, which is a first output state, and an intermittent state SA3, which is a first intermittent state. The second channel transitions between a preparation state SB1, which is a second preparation state, an output state SB2, which is a second output state, and an intermittent state SB3, which is a second intermittent state.

The output states SA2 and SB2 are states in which the control circuit 24 causes the drive pulses to be output from the power transmission drivers 18 and 19. The preparation states SA1 and SB1 are states that are after the intermittent states SA3 and SB3 and before the output states SA2 and SB2. The intermittent states SA3 and SB3 are states in which the control circuit 24 does not transmit power from the power transmission drivers 18 and 19. Note that the intermission period is the period obtained by combining the periods of the intermittent states SA3 and SB3 and the periods of the preparation states SA1 and SB1.

The drive pulses output in the output states SA2 and SB2 are stepped waveforms with three steps. In a stepped waveform, the power source voltages VHA and VHB of the second step are higher than the power source voltages VHA and VHB of the first step, and the power source voltages VHA and VHB of the third step are higher than the power source voltages VHA and VHB of the second step. Note that the number of steps of the stepped waveform is not limited to three steps. Also, the drive pulse is not limited to a stepped waveform and may also be a rectangular waveform. The periods of the output states SA2 and SB2 are the widths of the drive pulses, and are each equal to (number of steps of stepped waveform)×(period of one step).

Hereinafter, state control in landing detection and removal detection will both be described with reference to FIG. 7, but the lengths of the periods corresponding to the states in landing detection and the lengths of the periods corresponding to the state in removal detection may be different. For example, the length of the intermission period corresponding to the intermittent states SA3 and SB3 in landing detection may be different from the length of the intermission period corresponding to the intermittent states SA3 and SB3 in removal detection.

Figure 8:
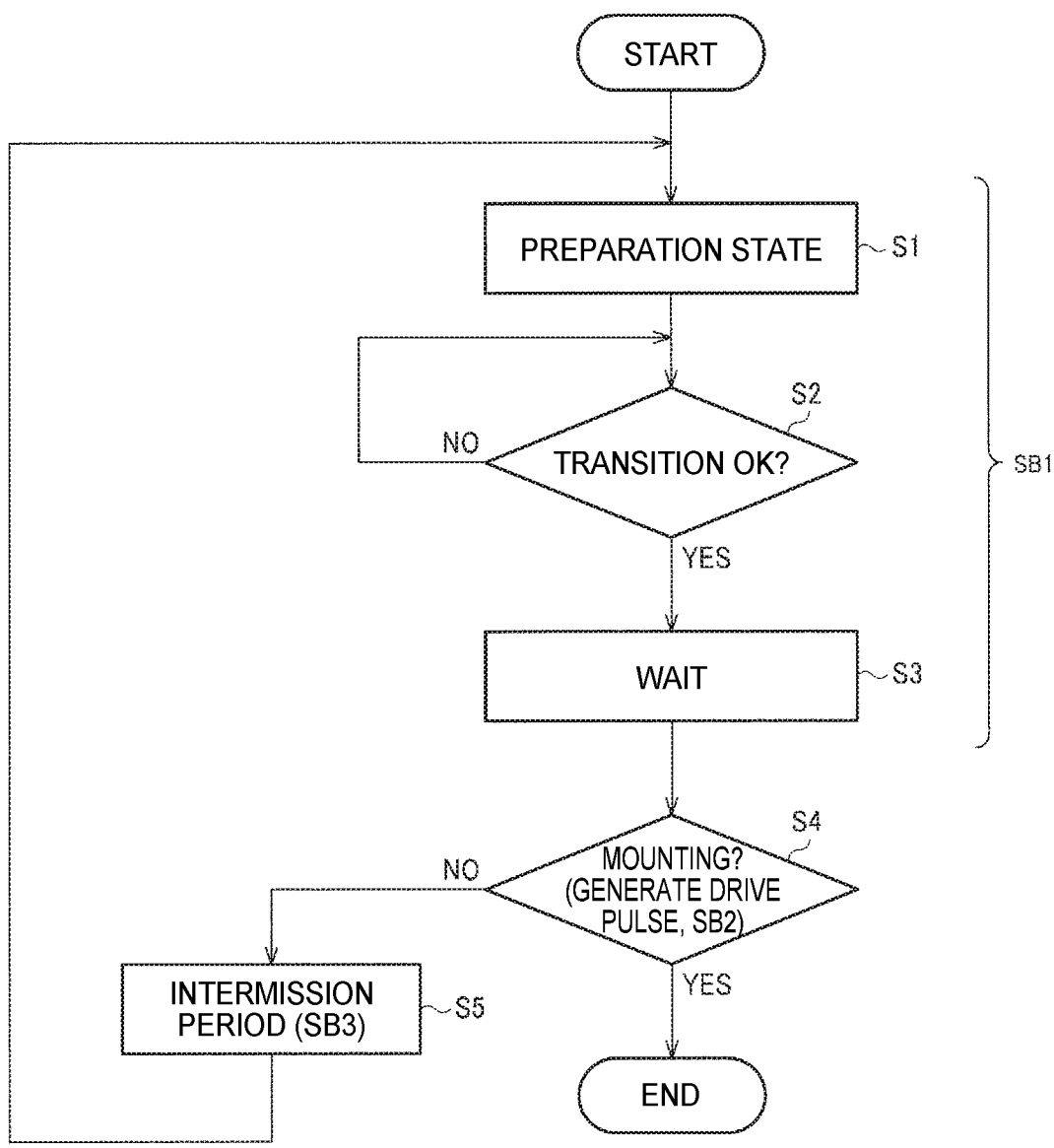
FIG. 8 is a flowchart of state control when a second channel performs landing detection.

FIG. 8 is a flowchart of state control for generating the waveform of FIG. 7 when the second channel performs landing detection. It is assumed that the first channel is performing landing detection or removal detection.

As shown in step S1, the second channel enters the preparation state SB1. As shown in step S2, in the preparation state SB1, the control circuit 24 monitors the state of the first channel and judges whether or not to transition to the output state SB2 based on the result of monitoring. When the first channel is not in the preparation state SA1 or the output state SA2, as shown in step S3, the control circuit 24 causes the second channel to transition to the output state SA2 after waiting for a predetermined wait period WT. In this case, the period of the preparation state SA1 is the same as the wait period WT.

In step S2, when the first channel is in the preparation state SA1 or the output state SA2, the control circuit 24 continues the monitoring of step S2 until the first channel transitions to a state that is not the preparation state SA1 or the output state SA2. That is, the control circuit 24 keeps the second channel in the preparation state SB1 until the output state SA2 of the first channel ends. When the first channel transitions to a state that is not the preparation state SA1 or the output state SA2, as shown in step S3, the control circuit 24 causes the second channel to transition to the output state SA2 after waiting for a predetermined wait period WT. That is, the control circuit 24 waits for the end of the output of the drive pulse in the first channel and then causes the second channel to transition to the output state.

As shown in step S4, the control circuit 24 causes the power transmission driver 19 to output a drive pulse in the output state SB2 and performs landing detection. When the load modulation from the power reception apparatus 41 is not received by the communication circuit 33, the control circuit 24 judges that the power reception apparatus 41 is not landed, and causes the second channel to transition to the intermittent state SB3 as shown in step S5. After the intermittent state SB3 ends, the control circuit 24 causes the second channel to transition to the preparation state SB1 of step S1. In step S4, when the load modulation from the power reception apparatus 41 is received by the communication circuit 33, the control circuit 24 judges that the power reception apparatus 41 is landed, ends the landing detection of the second channel, and causes a transition to normal power transmission.

Figure 9:
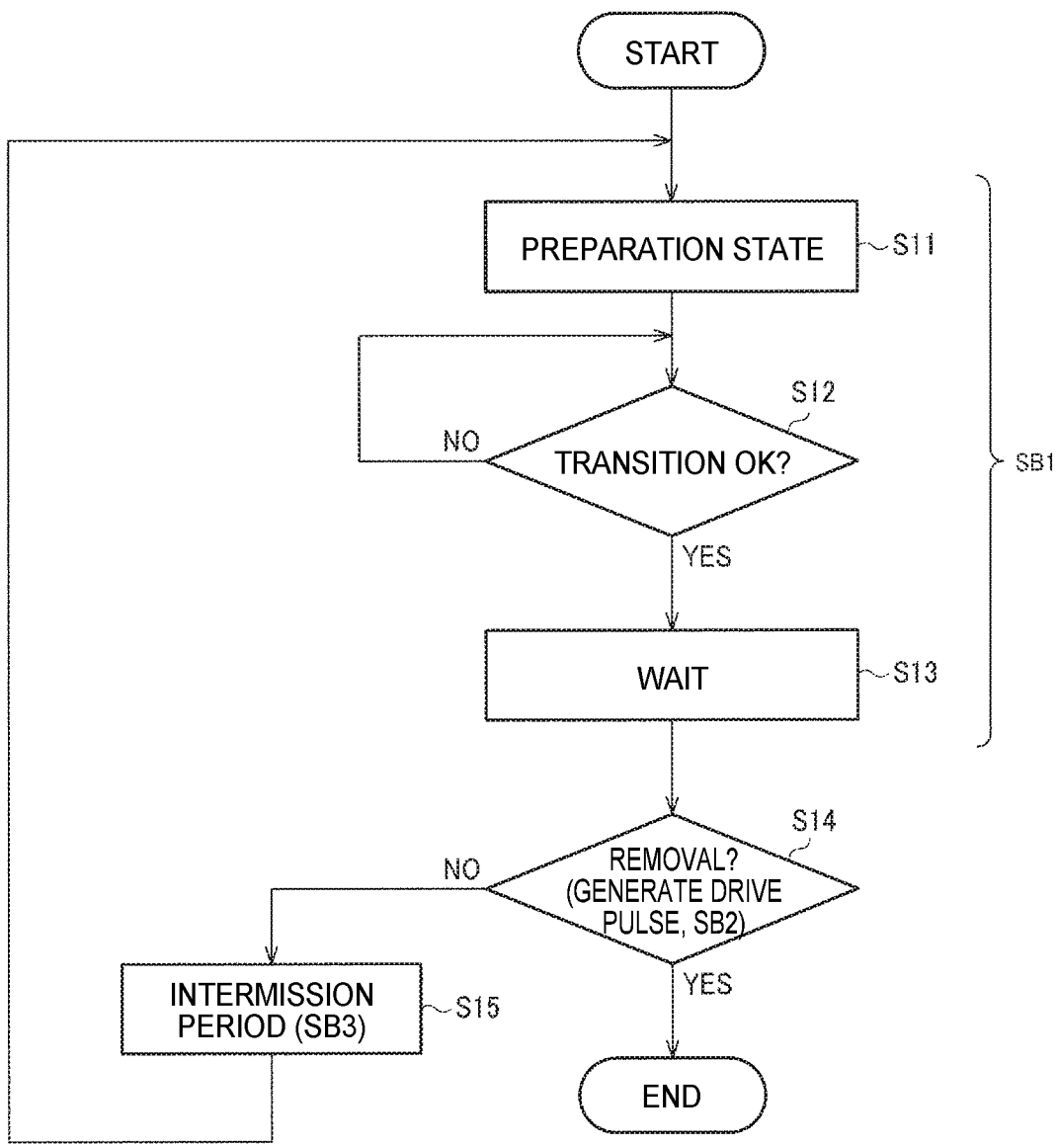
FIG. 9 is a flowchart of state control when the second channel performs removal detection.

FIG. 9 is a flowchart of state control for generating the waveform of FIG. 7 when the second channel performs landing detection. It is assumed that the first channel is performing landing detection or removal detection. Note that steps S11 to S13 and S15 are the same as steps S1 to S3 and S5 of FIG. 8, and therefore description thereof is omitted.

As shown in step S14, the control circuit 24 causes the power transmission driver 19 to output the drive pulse in the output state SB2 and performs removal detection. When the load modulation from the power reception apparatus 41 is received by the communication circuit 33, the control circuit 24 judges that the power reception apparatus 41 has not been removed, and causes the second channel to transition to the intermittent state SB3 as shown in step S5. After the intermittent state SB3 ends, the control circuit 24 causes the second channel to transition to the preparation state SB1 of step S1. When the load modulation from the power reception apparatus 41 is not received by the communication circuit 33 in step S4, the control circuit 24 judges that the power reception apparatus 41 has been removed, ends the removal detection of the second channel, and causes a transition to landing detection.

By performing the above-described state control, it is possible to shift the drive pulses such that the drive pulse of the first channel and the drive pulse of the second channel do not overlap in landing detection and removal detection performed through intermittent power transmission. Accordingly, even when coils in different channels couple, it is possible to prevent interference between the channels, and it is possible to prevent erroneous detection of landing and erroneous detection of removal.

Note that the control circuit 24 sets the lengths of the periods of the states based on information stored in the register 29. The wait period WT, the output interval of the drive pulse, and the width information of the drive pulse are stored in the register 29.

The wait period WT is the period from the timing of the end of the output of the drive pulse in the first channel to the timing of the start of the output of the drive pulse in the second channel. That is, the wait period WT is the period from when the output state SA2 of the first channel ends to when the second channel transitions to the output state SB2.

The output interval information of the drive pulse is information designating the output interval of the drive pulse, and need not be the output interval of the drive pulse itself. Specifically, the length of the period of the intermittent state SB3 is stored in the register 29 as the output interval information. The actual output interval is obtained by adding the period of the intermittent state SB3 and the length of the wait period WT.

The width information of the drive pulse is information for designating the time width of the drive pulse, and need not be the time width of the drive pulse itself. Specifically, the number of steps in the stepped waveform and the length of a period of one step are stored in the register 29. As described above, the width of the drive pulse is (number of steps in stepped waveform)×(period of one step). The time width of the drive pulse corresponds to the length of the output state SB2.

The pulse cycle, which is the aland of time from the start of output of the drive pulse to the start of output of the next drive pulse is determined according to the above-described parameters. The above-described parameter is set such that the pulse cycle does not exceed a predetermined period. Specifically, the above-described pulse cycle is set such that the period from when it is judged that removal has been performed to when discharging of the battery is started is not exceeded in the removal detection on the power reception side. For example, the power reception apparatus includes a capacitor that holds a rectified voltage. The capacitor holds the rectified voltage in the power transmission period of intermittent power transmission, and the capacitor discharges the held voltage in the intermission period. When the held voltage of the capacitor falls below a threshold value voltage for judging the start of discharging, the power reception apparatus starts discharging the battery. The aland of time until the start of discharging corresponds to a predetermined period. When the pulse cycle is shorter than the predetermined period, the held voltage of the capacitor does not fall below the threshold value voltage, and therefore discharging is not started.

4. Power Reception Apparatus

Figure 10:
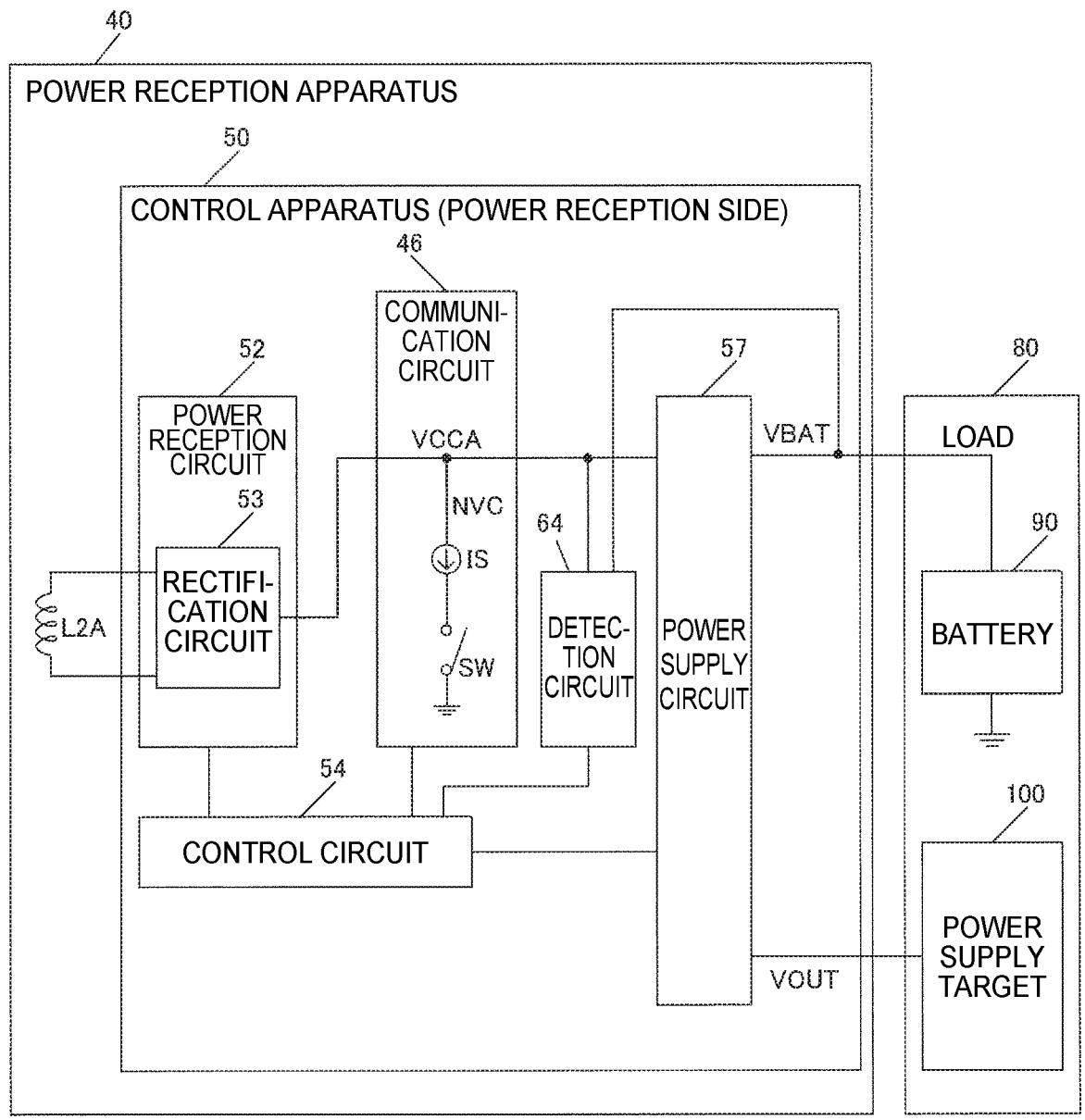
FIG. 10 is an example of a detailed configuration of a power reception apparatus.

FIG. 10 is an example of a detailed configuration of the power reception apparatus 40. Note that the power reception apparatus 41 also has a similar configuration. The power reception apparatus 40 includes the secondary coil L2A and the control apparatus 50. The control apparatus 50 includes: a power reception circuit 52; a communication circuit 46; a control circuit 54, which is a power reception control circuit; a detection circuit 64; and a power supply circuit 57.

The power reception circuit 52 includes a rectifying circuit 53 that is constituted by multiple transistors, diodes, and the like. The rectifying circuit 53 converts the alternating-current induced voltage of the secondary coil L2A into a direct-current rectified voltage VCCA and outputs the result.

The communication circuit 46 is a load modulation circuit that modulates the output load of the rectifying circuit 53. The communication circuit 46 includes a current source IS and a switch element SW. The switch element SW is constituted by a transistor. The current source IS and the switch element SW are provided in series between a node NVC of the rectified voltage VCCA and a ground node, for example. Also, due to the switch element SW turning on or off based on a control signal from the control circuit 54, the current of the current source IS flows to the ground GND or does not flow. Accordingly, load modulation is realized. Note that the communication circuit 46 is not limited to the configuration of FIG. 10, and various modifications, such as using a resistor instead of the current source IS, for example, are possible.

The power supply circuit 57 supplies power to a load 80 based on the power received by the power reception circuit 52. Specifically, the load 80 includes a battery 90 and a power supply target 100. The power supply target 100 consumes the power supplied from the power supply circuit 57 and is, for example, a processing apparatus such as a CPU, or various electronic circuits. The power supply circuit 57 includes a charging circuit for charging the battery 90, and a discharging circuit for supplying power to the power supply target 100 by discharging the battery 90. The discharging circuit is a DC-DC converter for converting the battery voltage VBAT into an output voltage VOUT, for example. The battery 90 is a secondary battery such as a lithium ion battery, for example.

The detection circuit 64 detects the rectified voltage VCCA and the battery voltage VBAT and outputs the detection result to the control circuit 54. For example, the detection circuit 64 is an A/D conversion circuit that converts the rectified voltage VCCA and the battery voltage VBAT into a digital value.

The control circuit 54 executes various types of control processing on the units of the control apparatus 50 on the power reception side. For example, the control circuit 24 performs various types of control based on the detection result from the detection circuit 64. Taking the landing detection of FIG. 4 as an example, when the rectified voltage VCCA becomes greater than the threshold value voltage as indicated by C1, the control circuit 24 causes the communication circuit 46 to perform load modulation. The control circuit 54 can be realized by various types of processors, such as a microcomputer or a logic circuit generated using an automatic placement and routing method, such as a gate array.

5. Operation Sequence of Contactless Power Transmission System

Figure 11:
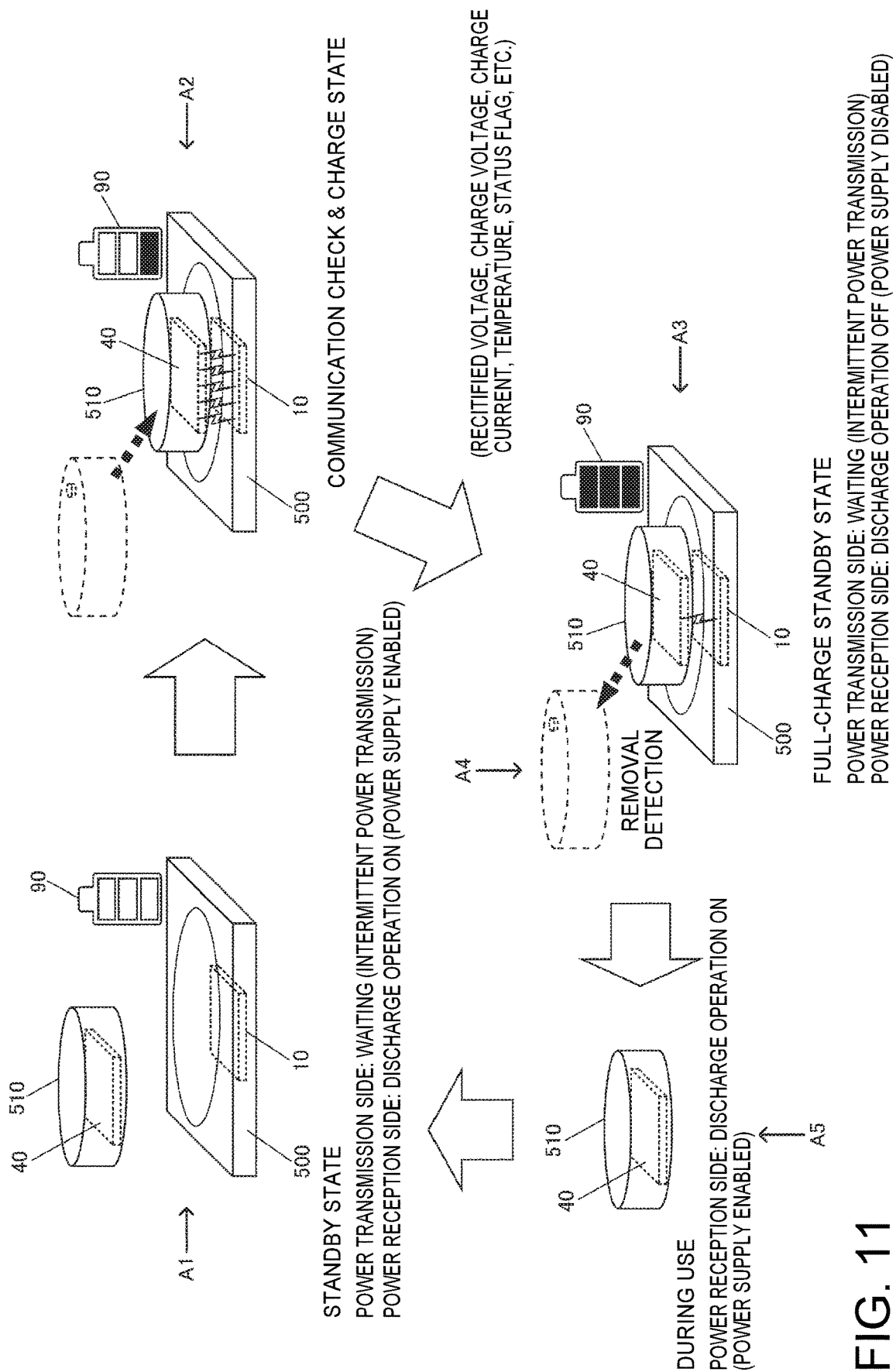
FIG. 11 is a diagram illustrating an overview of an operation sequence of a contactless power transmission system.

Next, an example of an operation sequence of the contactless power transmission system 200 will be described. FIG. 11 is a diagram illustrating an overview of an operation sequence. Note that hereinafter, an operation sequence of the power transmission apparatus 10 and the power reception apparatus 40 will be described as an example, but the operation sequence of the power transmission apparatus 10 and the power reception apparatus 41 is similar thereto. The operation sequences between the power transmission apparatus 10 and the power reception apparatuses 40 and 41 are controlled independently. However, the output timing of the drive pulse in intermittent power transmission is controlled using the above-described method.

In A1 of FIG. 11, an electronic device 510 including the power reception apparatus 40 has not been placed on the charger 500 including the power transmission apparatus 10, and is in a removed state. In this case, a standby state has been entered. In the standby state, the power transmission circuit 12 of the power transmission apparatus 10 performs intermittent power transmission for landing detection to detect landing of the electronic device 510. Also, in the standby state, an operation of discharging power to the power supply target 100 is turned on in the power reception apparatus 40. Accordingly, the power supply target 100, such as a processing apparatus, receives a supply of power from the battery 90 and thus can operate.

As shown in A2 of FIG. 11, the electronic device 510 is placed on the charger 500, and when landing is detected, a communication check and charging state is entered. In the communication check and charging state, the power transmission circuit 12 of the power transmission apparatus 10 performs normal power transmission, which is continuous power transmission. At this time, normal power transmission is performed while power control according to which the power variably changes according to the state of power transmission or the like is performed. Control based on the charge state of the battery 90 is also performed. The state of power transmission is determined according to the positional relationship between the primary coil L1A and the secondary coil L2A or the like, for example, and can be judged based on information such as the rectified voltage VCCA of the power reception circuit 52, for example. The charge state of the battery 90 can be judged based on information such as the battery voltage VBAT, for example.

Also, in the communication check and charging state, the charging operation is turned on in the power reception apparatus 40, and the charging of the battery 90 is performed based on the power received by the power reception circuit 52. Also, the discharge operation is turned off in the power reception apparatus 40 and the power from the battery 90 is no longer supplied to the power supply target 100. Also, in the communication check and charging state, communication data is transmitted to the power transmission side through load modulation of the communication circuit 46. The communication data includes information such as power transmission state information, charging state information, and temperature, for example. The power transmission state information is information on the rectified voltage VCCA, or the like. The charging state information is information such as the battery voltage VBAT or various types of status flags.

As shown in A3 of FIG. 11, when full charging of the battery 90 is detected, a full-charge standby state is entered. In the full-charge standby state, the power transmission circuit 12 performs intermittent power transmission for removal detection to detect removal of the electronic device 510, for example. Also, the discharging operation remains off in the power reception apparatus 40.

If removal of the electronic device 510 is detected as indicated by A4 in FIG. 11, the electronic device 510 enters a usage state as indicated by A5, the discharging operation turns on in the power reception apparatus 40, and the power from the battery 90 is supplied to the power supply target 100 via the power supply circuit 57. Accordingly, the power supply target 100, such as a processing apparatus, operates, and the user can use the electronic device 510 normally.

As described above, landing detection and removal detection performed through intermittent power transmission are performed in a series of operation sequences. The power transmission apparatus 10 of the present embodiment performs control for shifting the drive pulse such that the output timings of the drive pulses in the channels do not overlap in the landing detection and the removal detection. Hereinafter, an example of a waveform in state transition including landing detection or removal detection will be indicated. Note that there is no limitation to the following example of state transitioning, and the method of the present embodiment can be applied to the landing detection or the removal detection in the operation sequence.

Figure 12:
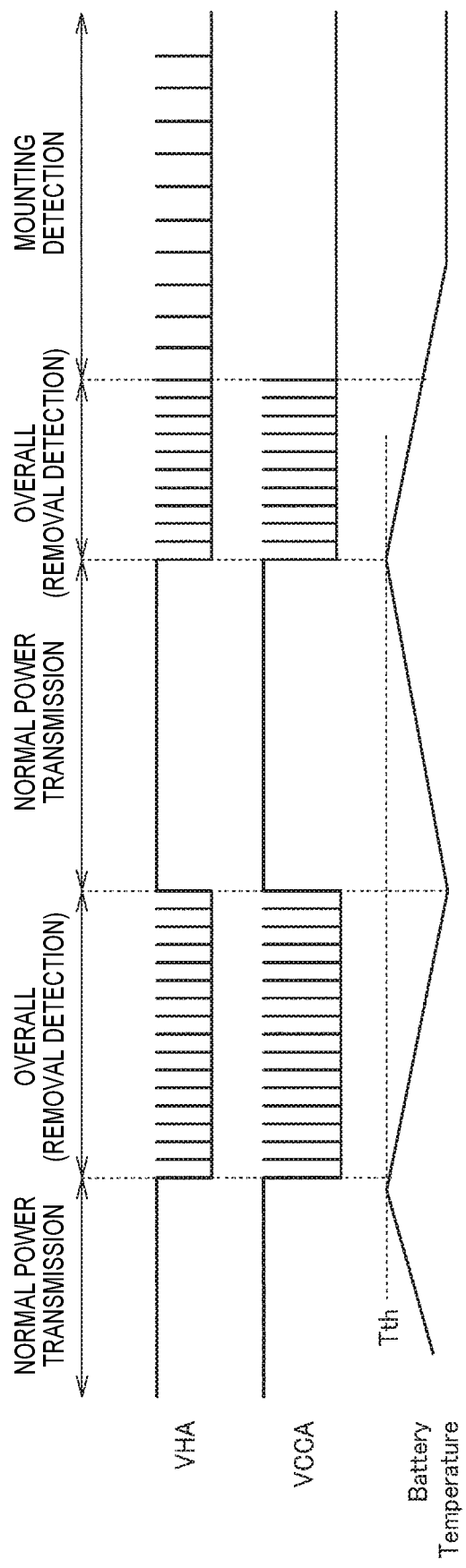
FIG. 12 is an example of a waveform when performing removal detection in an overall operation resulting from a battery temperature abnormality.

FIG. 12 is an example of a waveform obtained when performing removal detection in an overall operation resulting from a battery temperature abnormality.

The control circuit 54 of the power reception apparatus 40 acquires the temperature detection information of the battery 90 and transmits the temperature detection information to the power transmission apparatus 10 through load modulation of the communication circuit 46. The control circuit 24 of the power transmission apparatus 10 controls power transmission to the power reception apparatus 40 based on the received temperature detection information.

When the temperature of the battery 90 exceeds a threshold value Th in normal power transmission, the control circuit 24 stops normal power transmission and transitions to an overall operation. In the overall operation, the control circuit 24 stops normal power transmission until a predetermined aland of time elapses, and thereafter receives the temperature detection information from the power reception apparatus 40 by once again performing normal power transmission. Also, the control circuit 24 determines whether or not the temperature of the battery 90 has exceeded a threshold value Tth based on the received temperature detection information. If the temperature of the battery 90 has not exceeded the threshold value Tth, the control circuit 24 causes a return from the overall operation to normal power transmission.

In the overall operation, the control circuit 24 performs removal detection. In removal detection during the overall operation, when the control circuit 24 judges that the power reception apparatus 40 has been removed, the control circuit 24 transitions to landing detection. In the removal detection and the landing detection, drive pulse shift control in the present embodiment is performed.

Figure 13:
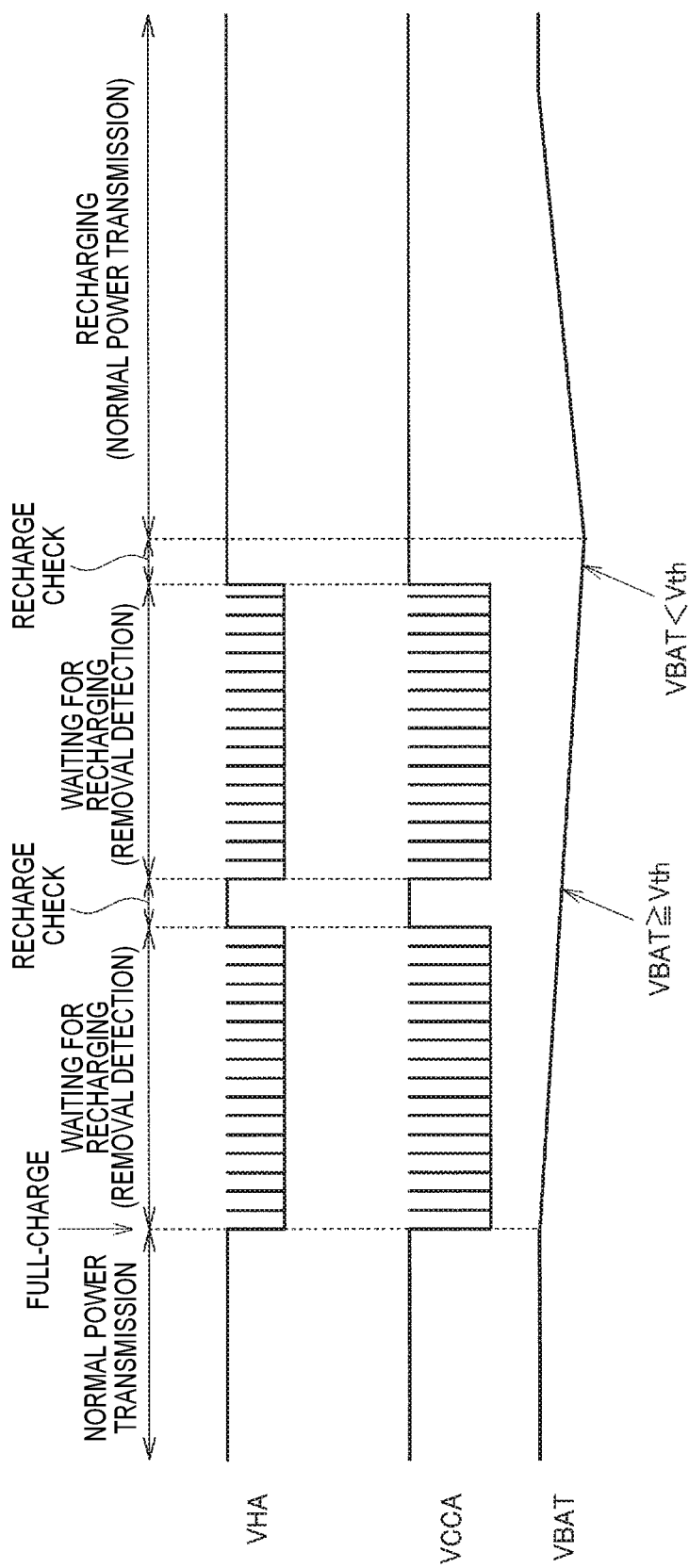
FIG. 13 is an example of a waveform when performing removal detection while waiting for re-charging after fully charging a battery.

FIG. 13 is an example of a waveform obtained when performing removal detection while waiting for re-charging after the battery has been fully charged.

The control circuit 54 of the power reception apparatus 40 acquires the detection information of the battery voltage VBAT from the detection circuit 64. The control circuit 54 controls the charge state based on the detection information of the battery voltage VBAT. The control circuit 54 transmits information on the charge state to the power transmission apparatus 10 through load modulation of the communication circuit 46. The control circuit 24 of the power transmission apparatus 10 controls power transmission to the power reception apparatus 40 based on the received charge state information.

When the battery voltage VBAT exceeds the threshold value voltage that indicates a full charge, the control circuit 54 stops the charging of the battery voltage VBAT and transmits information on the charge state that indicates a full charge to the power transmission apparatus 10. When the information on the charge state indicating a full charge is received, the control circuit 24 of the power transmission apparatus 10 transitions from normal power transmission to waiting for recharging. During waiting for recharging, the control circuit 24 stops normal power transmission until a predetermined aland of time elapses, and thereafter transitions to a recharge check. In the recharge check, the control circuit 24 receives information on the charge state from the power reception apparatus 40 by performing normal power transmission. When normal power transmission of the recharge check is performed, the control circuit 54 of the power reception apparatus 40 determines whether or not the battery voltage VBAT is lower than the threshold value voltage Vth of recharging. When the battery voltage VBA is greater than or equal to the threshold value voltage Vth, the control circuit 54 keeps the charging stopped. In this case, the control circuit 24 of the power transmission apparatus 10 once again transitions to waiting for recharging. On the other hand, when the battery voltage VBAT is lower than the threshold value voltage Vth, the control circuit 54 resumes charging. In this case, the control circuit 24 of the power transmission apparatus 10 transitions to normal power transmission.

During waiting for recharging, the control circuit 24 performs removal detection. When the control circuit 24 judges that the power reception apparatus 40 has not been removed in the removal detection during waiting for recharging, the control circuit 24 transitions to a recharge check after the elapse of a predetermined aland of time. On the other hand, when the control circuit 24 judges that the power reception apparatus 40 has been removed, the control circuit 24 transitions to landing detection. In the removal detection and the landing detection, drive pulse shift control in the present embodiment is performed.

As described above, the control apparatus of the present embodiment controls a first power transmission driver and a second power transmission driver. The first power transmission driver transmits power to the first power reception apparatus by driving a first primary coil. The second power transmission driver transmits power to the second power reception apparatus by driving a second primary coil. The control apparatus includes the control circuit. Landing detection or removal detection of the first power reception apparatus through intermittent power transmission is performed in the first channel in which power transmission is performed by the first power transmission driver. Also, landing detection or removal detection of the second power reception apparatus through intermittent power transmission is performed in the second channel in which power transmission is performed by the second power transmission driver. In this case, the control circuit controls the transmission timing of the second drive pulse such that the first drive pulse in intermittent power transmission of the first channel and the second drive pulse in intermittent power transmission of the second channel do not overlap.

According to the present embodiment, when both the first channel and the second channel perform intermittent power transmission, the first drive pulse of the first channel and the second drive pulse of the second channel no longer overlap. Accordingly, even when interference occurs between the channels due to coupling of the coils, the drive pulses, which are the cause of interference, no longer overlap. Accordingly, erroneous detection of landing or removal can be prevented.

Also, in the present embodiment, in state control of intermittent power transmission in the first channel and intermittent power transmission in the second channel, when the first channel is in the first output state, which is the output state of the first drive pulse, the control circuit may wait for the end of output of the first drive pulse and cause the second channel to transition to the second output state, which is the output state of the second drive pulse.

By doing so, after the output state of the first drive pulse ends in the first channel, the second channel transitions to the output state of the second drive pulse. Accordingly, when the first drive pulse of the first channel and the second drive pulse of the second channel overlap, the drive pulse of the second channel is shifted to after the drive pulse of the first channel. That is, the first drive pulse of the first channel and the second drive pulse of the second channel no longer overlap.

Also, in the present embodiment, when the second channel is in a second preparation state before the second output state, the control circuit monitors the state of the first channel. Then, when the first channel is in a first preparation state before the first output state, or in the first output state in the monitor, the control circuit causes the second channel to stand by in the second preparation state until the first output state ends, and thereafter causes the second channel to transition to the second output state.

By doing so, due to the state of the first channel being monitored in the preparation state of the second channel, it is possible to judge whether or not the drive pulse has been output in a first channel before the drive pulse of the second channel is output. Then, when the first channel is in a preparation state or an output state, the second channel is transitioned to the output state after the output state ends. Accordingly, when the first drive pulse of the first channel and the second drive pulse of the second channel overlap, the drive pulse of the second channel is shifted to after the drive pulse of the first channel. That is, the first drive pulse of the first channel and the second drive pulse of the second channel no longer overlap.

Also, in the present embodiment, a register may also be included which stores the length of the period from the output end timing of the first drive pulse in the first channel to the output start timing of the second drive pulse in the second channel.

By doing so, the length of the period stored in the register can be set as the length of the wait period, and the control circuit can wait for the output start timing of the drive pulse in the second channel. That is, the control circuit causes the second channel to stand by in the preparation state until the output state of the first channel ends, and thereafter waits for the wait period stored in the register. Then, the control circuit causes the second channel to transition to the second output state after the wait ends. Accordingly, the first drive pulse of the first channel and the second drive pulse of the second channel are separated by the wait period, and therefore it is possible to reliably prevent the first drive pulse of the first channel and the second drive pulse of the second channel from overlapping.

Also, in the present embodiment, the register may also store the output embodiment information of the drive pulse in intermittent power transmission and the width information of the drive pulse.

By doing so, the output interval information of the drive pulse and the width information of the drive pulse can be set such that the pulse cycle of the drive pulse in removal detection does not exceed the predetermined period. Accordingly, it is possible to prevent discharging from the battery from being performed while the power reception apparatus receives intermittent power transmission in the removal detection, or that is, while the power reception apparatus is not removed.

Also, in the present embodiment, when landing detection is performed in the first channel and the landing detection in the second channel is performed, the control circuit may also control the transmission timing of the second drive pulse such that the first drive pulse and the second drive pulse do not overlap.

By doing so, when both the first channel and the second channel perform landing detection through intermittent power transmission, the first drive pulse and the second drive pulse can be prevented from overlapping. Accordingly, it is possible to prevent erroneous detection of landing in the first channel and the second channel.

Also, in the present embodiment, when load modulation performed by the first power reception apparatus as a response to the first drive pulse is detected in the first channel, the control circuit may also determine that the first power reception apparatus is landed. Also, when load modulation performed by the second power reception apparatus as a response to the second drive pulse is detected in the second channel, the control circuit may also determine that the second power reception apparatus is landed.

According to the present embodiment, the drive pulse of the first channel and the drive pulse of the second channel do not overlap, and therefore when the load modulation on the drive pulse is performed in one channel, the drive pulse is not output in the other channel. Accordingly, interference between channels due to load modulation no longer occurs, and therefore erroneous detection of landing can be prevented.

Also, in the present embodiment, when the removal detection is performed in the first channel and the removal detection in the second channel is performed, the control circuit may also control the transmission timing of the second drive pulse such that the first drive pulse and the second drive pulse do not overlap.

By doing so, when both the first channel and the second channel perform removal detection through intermittent power transmission, the first drive pulse and the second drive pulse can be prevented from overlapping. Accordingly, it is possible to prevent erroneous detection of removal in the first channel and the second channel.

Also, in the present embodiment, the control circuit may also determine that the first power reception apparatus has been removed when load modulation performed by the first power reception apparatus as a response to the first drive pulse is not detected in the first channel. Also, in the present embodiment, the control circuit may also determine that the second power reception apparatus has been removed when load modulation performed by the first power reception apparatus as a response to the second drive pulse is not detected in the second channel.

According to the present embodiment, the drive pulse of the first channel and the drive pulse of the second channel do not overlap, and therefore when the load modulation on the drive pulse is performed in one channel, the drive pulse is not output in the other channel. Accordingly, interference between channels due to load modulation no longer occurs, and therefore erroneous detection of removal can be prevented.

Also, the power transmission apparatus of the present embodiment includes the above-described control apparatus, first primary coil, first power transmission driver, second primary coil, and second power transmission driver.

Also, the contactless power transmission system of the present embodiment includes the above-described power transmission apparatus, first power reception apparatus, and second power reception apparatus.

Also, the electronic device of the present embodiment includes the above-described control apparatus.

Note that although an embodiment has been explained in detail above, a person skilled in the art will readily appreciate that it is possible to implement numerous variations and modifications that do not depart substantially from the novel aspects and effect of the invention. Accordingly, all such variations and modifications are also to be included within the scope of the invention. For example, terms that are used within the description or drawings at least once together with broader terms or alternative synonymous terms can be replaced by those other terms at other locations as well within the description or drawings. Also, all combinations of the embodiment and variations are also encompassed in the scope of the invention. Also, configurations, operations, and the like of the control apparatus, the power transmission circuit, the power transmission apparatus, the power reception apparatus, the contactless power transmission system, and the electronic device are not limited to the description in the present embodiment and can be modified in various ways.

What is claimed is:

1. A control apparatus for controlling a first power transmission driver configured to transmit power to a first power reception apparatus by driving a first primary coil and a second power transmission driver configured to transmit power to a second power reception apparatus by driving a second primary coil, the control apparatus comprising
   a control circuit,
   wherein when landing detection or removal detection for the first power reception apparatus through intermittent power transmission is performed in a first channel in which power transmission is performed by the first power transmission driver, and landing detection or removal detection for the second power reception apparatus through intermittent power transmission is performed in a second channel in which power transmission is performed by the second power transmission driver,
   the control circuit controls a transmission timing of a second drive pulse in the intermittent power transmission of the second channel such that a first drive pulse in the intermittent power transmission of the first channel and the second drive pulse do not overlap.

2. The control apparatus according to claim 1, wherein in state control of the intermittent power transmission in the first channel and the intermittent power transmission in the second channel, when the first channel is in a first output state, which is a state of outputting the first drive pulse, the control circuit waits for the end of outputting the first drive pulse and then causes the second channel to transition to a second output state, which is a state of outputting the second drive pulse.

3. The control apparatus according to claim 2, wherein the control circuit monitors a state of the first channel when the second channel is in a second preparation state that is prior to the second output state, and when the first channel is in a first preparation state that is prior to the first output state, or in the first output state in the monitoring, the control circuit causes the second channel to stand by in the second preparation state until the first output state ends, and thereafter causes the second channel to transition to the second output state.

4. The control apparatus according to claim 2, comprising a register configured to store a length of a period from an output end timing for the first drive pulse in the first channel to an output start timing for the second drive pulse in the second channel.

5. The control apparatus according to claim 4, wherein the register stores output interval information of the drive pulse in the intermittent power transmission and width information of the drive pulse.

6. The control apparatus according to claim 1, wherein when the landing detection is performed in the first channel and the landing detection is performed in the second channel, the control circuit controls a transmission timing of the second drive pulse such that the first drive pulse and the second drive pulse do not overlap.

7. The control apparatus according to claim 6, wherein when load modulation performed by the first power reception apparatus as a response to the first drive pulse is detected in the first channel, the control circuit determines that the first power reception apparatus is landed, and when load modulation performed by the second power reception apparatus as a response to the second drive pulse is detected in the second channel, the control circuit determines that the second power reception apparatus is landed.

8. The control apparatus according to claim 1, wherein when the removal detection is performed in the first channel and the removal detection is performed in the second channel, the control circuit controls a transmission timing of the second drive pulse such that the first drive pulse and the second drive pulse do not overlap.

9. The control apparatus according to claim 8, wherein when load modulation performed by the first power reception apparatus as a response to the first drive pulse is not detected in the first channel, the control circuit determines that the first power reception apparatus has been removed, and when load modulation performed by the second power reception apparatus as a response to the second drive pulse is not detected in the second channel, the control circuit determines that the second power reception apparatus has been removed.

10. A power transmission apparatus comprising:
the control apparatus according to claim 1;
the first primary coil;
the first power transmission driver;
the second primary coil; and
the second power transmission driver.

11. A contactless power transmission system comprising:
the power transmission apparatus according to claim 10;
the first power reception apparatus; and
the second power reception apparatus.

12. An electronic device comprising the control apparatus according to claim 1.

* * * * *